United States Patent
Bolding et al.

(10) Patent No.: US 7,162,743 B1
(45) Date of Patent: Jan. 9, 2007

(54) SYSTEM AND METHOD OF LIMITING ACCESS TO PROTECTED HARDWARE ADDRESSES AND PROCESSOR INSTRUCTIONS

(75) Inventors: Joe Bolding, Allen, TX (US); Dan Tormey, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 09/971,327

(22) Filed: Oct. 4, 2001

(51) Int. Cl.
*G06F 7/04* (2006.01)
*H04L 9/32* (2006.01)

(52) U.S. Cl. .............................. 726/27; 726/30; 726/34
(58) Field of Classification Search ................ 713/200; 726/27, 30, 34
See application file for complete search history.

(56) References Cited

U.S. PATENT DOCUMENTS

| | | | | |
|---|---|---|---|---|
| 4,313,161 | A * | 1/1982 | Hardin et al. ................ | 711/151 |
| 4,513,174 | A * | 4/1985 | Herman ....................... | 711/214 |
| 4,652,998 | A * | 3/1987 | Koza et al. ................... | 463/26 |
| 5,210,850 | A * | 5/1993 | Kelly et al. .................. | 710/220 |
| 5,452,431 | A * | 9/1995 | Bournas ....................... | 711/115 |
| 5,685,011 | A * | 11/1997 | Rosenthal et al. ............ | 710/3 |
| 5,851,149 | A * | 12/1998 | Xidos et al. .................. | 463/42 |
| 5,878,258 | A * | 3/1999 | Pizi et al. .................... | 719/320 |
| 5,887,169 | A * | 3/1999 | Lacombe ..................... | 719/311 |
| 5,987,557 | A * | 11/1999 | Ebrahim ...................... | 710/200 |
| 6,006,328 | A * | 12/1999 | Drake .......................... | 713/200 |
| 6,047,388 | A * | 4/2000 | Bashore et al. ............... | 714/38 |
| 6,175,916 | B1 * | 1/2001 | Ginsberg et al. ............. | 712/228 |
| 6,269,409 | B1 * | 7/2001 | Solomon ..................... | 719/329 |
| 6,412,070 | B1 * | 6/2002 | Van Dyke et al. .......... | 713/200 |
| 6,470,395 | B1 * | 10/2002 | Van Aken et al. .......... | 709/245 |
| 6,477,612 | B1 * | 11/2002 | Wang ............................ | 711/2 |
| 6,587,947 | B1 * | 7/2003 | O'Donnell et al. .......... | 713/187 |
| 6,604,123 | B1 * | 8/2003 | Bruno et al. ................. | 718/100 |
| 6,625,603 | B1 * | 9/2003 | Garg et al. ..................... | 707/9 |
| 6,763,327 | B1 * | 7/2004 | Songer et al. ................ | 703/21 |
| 6,889,258 | B1 * | 5/2005 | Liu et al. ...................... | 709/245 |
| 2001/0044891 | A1 * | 11/2001 | McGrath et al. ............. | 712/229 |
| 2002/0109726 | A1 * | 8/2002 | Rogers et al. ............... | 345/771 |
| 2002/0147870 | A1 * | 10/2002 | Khanna ....................... | 710/107 |
| 2003/0033594 | A1 * | 2/2003 | Bowen ......................... | 717/141 |
| 2003/0110307 | A1 * | 6/2003 | De Armas et al. .......... | 709/310 |
| 2004/0103305 | A1 * | 5/2004 | Ginter et al. ................ | 713/200 |
| 2004/0181801 | A1 * | 9/2004 | Hagen et al. ................. | 725/32 |
| 2004/0225805 | A1 * | 11/2004 | Vasudevan ................... | 710/305 |
| 2005/0041032 | A1 * | 2/2005 | Hill et al. ..................... | 345/556 |

\* cited by examiner

*Primary Examiner*—Nasser Moazzami
*Assistant Examiner*—Eleni Shiferaw

(57) ABSTRACT

A system and method for protecting a defined range of hardware addresses or a defined set of processor instructions from being accessed or executed by unauthorized software modules. Abstraction layer code is given a range of software addresses that are permitted to access the protected addresses or execute the instructions. Authorized accesses must utilize service routines provided by the abstraction layer code. When an attempted access to a protected hardware address is detected, it is determined whether the access is from the abstraction layer code. If so, the access is permitted. If not, the access is prohibited, and an error message is generated. A basic set of authorized processor instructions and an extended set of processor instructions may be defined for a reference platform. Execution of processor instructions in the extended set is limited to authorized abstraction layers. Otherwise, the attempted execution is prohibited, and an error message is generated.

21 Claims, 5 Drawing Sheets

SYSTEM AND METHOD OF LIMITING ACCESS TO PROTECTED HARDWARE ADDRESSES AND PROCESSOR INSTRUCTIONS

BACKGROUND OF THE INVENTION

1. Technical Field of the Invention

The present invention generally relates to computer hardware and operating system software. More particularly, and not by way of any limitation, the present invention is directed to a system and method of limiting access by software code to protected computer hardware addresses and a predefined set of processor instructions.

2. Description of Related Art

The current method of making an operating system (OS) portable to multiple hardware platforms is to specify a set of hardware in a reference platform specification that the OS can access. The reference platform is a set of restricted hardware and hardware-vendor-supplied software modules that meet an industry standard for the minimum hardware/software required to execute an OS. The hardware vendor supplies the software modules with a standard interface to allow any OS to use them. For example, a software module known as the Processor Abstraction Layer (PAL) is responsible for initializing the processor hardware. When utilized properly, no other code is allowed to modify the processor registers that control the initialization of the processor. End users are not supposed to have access to this initialization code or to the hardware registers themselves. Other software modules such as the Hardware Abstraction Layer (HAL) and the System Abstraction Layer (SAL) are designed to provide OS isolation from other hardware in the platform.

In addition to enabling the OS provider to design an OS that operates on different platforms, the proper use of abstraction layers also enables the microprocessor manufacturer to make changes to the microprocessor while still providing compatibility with end-user software by providing the end user with new HAL code. For example, the manufacturer may change the procedures inside the processor for setting up the internal cache, clearing the TLBs, and so on without impacting the ability of end users to run their software on the platform.

The use of abstraction layers is beset with several deficiencies, however. First, developers such as OS developers may inadvertently implement pointers in their software that directly access hardware registers. Such "wild pointers" can cause problems when changes are made to the hardware, or when the OS is used on a different platform. If the OS includes machine-specific code, that code will not execute correctly if the hardware is modified or if the OS is run on a new hardware platform. There is currently no mechanism to identify inadvertent machine-specific code in an OS.

Secondly, in the PC environment, third party software vendors such as game manufacturers may intentionally implement software that directly accesses restricted hardware such as the VGA video card in order to enhance the performance of their games. Ideally, the game manufacturers should use service routines provided by the OS, and the OS should then access the video card. However, there is currently no mechanism to identify software that intentionally accesses restricted hardware.

Thirdly, a mechanism is needed to restrict access to the instruction core, from any source, to a predefined set of instructions related to the particular CPU type (e.g., the CPU's basic instruction set). In a CPU family, there may be follow-on CPUs that build upon a basic set of CPU instructions with extensions to the basic set. Problems can arise when sources authorized to access the basic set of instructions access the extended instruction set. It should be appreciated that a solution to the aforementioned deficiencies would be highly desirable.

SUMMARY OF THE INVENTION

Accordingly, the present invention advantageously provides a method of protecting a defined hardware address from being directly accessed by unauthorized software modules. The method includes the steps of defining a protected hardware address; defining a software address that is permitted to access the protected hardware address; and detecting an attempted access to the protected hardware address. This is followed by determining whether the access is from the defined software address; permitting the access upon determining that the access is from the defined software address; and prohibiting the access upon determining that the access is not from the defined software address. The method may also include defining a set of valid processor instructions; determining whether a current processor instruction is in the defined set of valid instructions; and stopping processor operations upon determining that the current processor instruction is not in the defined set of valid instructions.

In a further aspect, the present invention is directed to a method of protecting a defined range of hardware addresses from being directly accessed by unauthorized software modules. The method includes the steps of defining a range of software addresses; associating a name of an abstraction layer with the defined range of software addresses; defining a range of protected hardware addresses; and associating a name of a hardware component with the defined range of hardware addresses. The abstraction layer is then specified as the only software that is permitted to access the range of hardware addresses associated with the name of the hardware component. This is followed by detecting an attempted access to a hardware address in the range of hardware addresses associated with the name of the hardware component, and determining whether the access is from a software address in the range of software addresses associated with the abstraction layer. If so, access is permitted. If not, the access is prohibited.

In a still further aspect, the present invention is directed to a method of protecting a defined range of hardware addresses from being directly accessed by unauthorized software modules. The method includes defining a range of software addresses; associating an abstraction layer with the defined range of software addresses; defining a range of protected hardware addresses; and associating a hardware component with the defined range of hardware addresses. The abstraction layer is then specified as the only software that is permitted to access the range of hardware addresses associated with the hardware component. When an attempted access to a hardware address is detected, the method determines whether the attempted access is directed to a hardware address in the range of hardware addresses associated with the hardware component. Upon determining that the attempted access is directed to a hardware address in the range of hardware addresses associated with the hardware component, the defined software address ranges are searched for a match to an instruction pointer in the attempted access. The access is prohibited if no match to the instruction pointer is found, or if a match is found in a software address range that is not associated with the abstraction layer.

In yet another aspect, the present invention is directed to a system for protecting a defined range of hardware addresses from being directly accessed by unauthorized software modules. The system includes a plurality of hardware components in a functional area of a processing machine. The hardware components have a defined range of protected hardware addresses. A memory device stores abstraction layer code having a defined range of software addresses. The abstraction layer code is permitted to access the hardware addresses in the defined range of protected hardware addresses. The system also includes access detecting means for detecting an attempted access to a hardware address in the defined range of protected hardware addresses, and software searching means for determining whether the attempted access is from the abstraction layer code. The system also includes error generation means for prohibiting the access and generating an error message upon determining that the access is not from the abstraction layer code.

In still yet another aspect, the present invention is directed to a method of verifying software code compliance with respect to a reference platform. The method includes the steps of associating a hardware component of the reference platform with a defined range of protected hardware addresses; defining a range of software addresses allowed to access the protected hardware addresses; and executing a code portion in a computing environment associated with the reference platform. It is then determined whether any instruction of the code portion attempting to access at least one of the protected hardware addresses is not from the range of software addresses allowed to access the hardware addresses. If so, a flag is provided to indicate the attempted access by the code portion to one of the protected hardware addresses.

In yet another aspect, the present invention is directed to a method of protecting a defined subset of processor instructions from being executed by unauthorized software modules. The method includes the steps of defining a set of authorized processor instructions; determining whether a processor instruction being accessed is in the defined set of authorized instructions; and prohibiting execution of the processor instruction upon determining that the processor instruction being accessed is not in the defined set of authorized instructions. The method may also include the steps of defining a software address that is permitted to execute the defined set of authorized processor instructions; determining whether an attempted execution of an instruction in the defined set of authorized processor instructions is from the defined software address; permitting execution of the instruction in the defined set of authorized processor instructions upon determining that the attempted execution is from the defined software address; and prohibiting execution of the instruction in the defined set of authorized processor instructions upon determining that the attempted execution is not from the defined software address.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
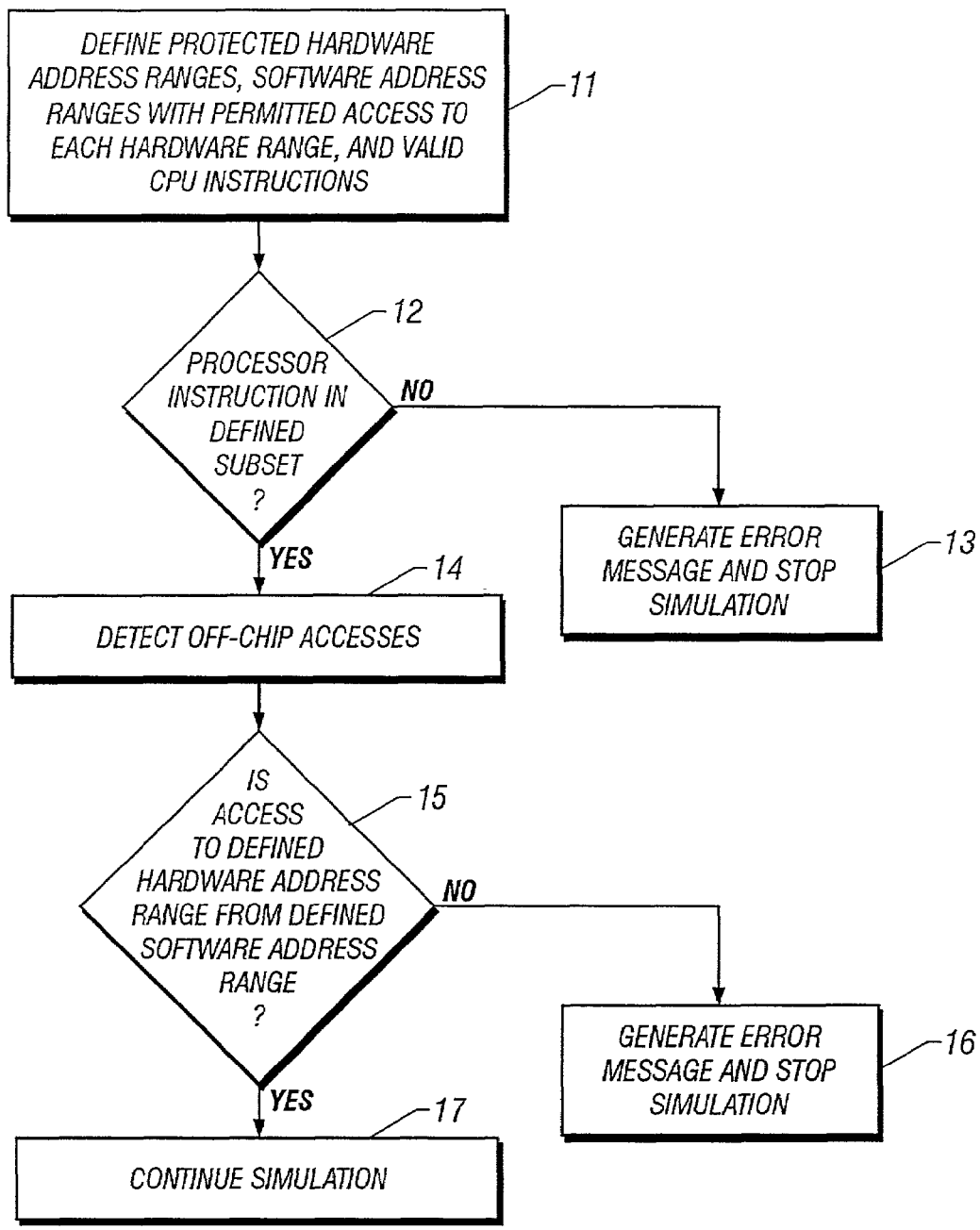
FIG. 1 depicts a flow chart of the overall steps involved in the method of the present invention.

In the drawings, like or similar elements are designated with identical reference numerals throughout the several views thereof, and the various elements depicted are not necessarily drawn to scale. The preferred embodiment of the present invention is described herein in the context of modifications to a simulator that is capable of modeling a reference platform. It should be appreciated that oftentimes the hardware development of a particular platform may not have advanced far enough to allow debug testing of the software code targeted for that platform. Typically, an architectural simulator is utilized in such instances. The simulator, which is operable to simulate a target hardware platform, can "execute" a particular piece of software intended for the target hardware as if it were run on the actual machine itself. It should be readily apparent to those skilled in the art, however, that the present invention may be advantageously practiced on actual hardware systems as well.

The present invention provides a method of protecting defined hardware address locations from being directly accessed by unauthorized software modules. All accesses that are not from the vendor-supplied software modules are flagged, and the simulation is stopped. If the defined hardware and software ranges are in compliance with the reference platform specification, this helps OS developers to ensure that their OS is portable across hardware platforms that conform to the reference platform specification.

Generically, then, if a software access is directed to a particular hardware address, the present invention determines whether the instruction that the access came from is from an enabled software address. If so, the access is permitted. If not, the access is denied. The preferred embodiment implements this process through software. Although the process can be performed with hardware gates, such an implementation would be more limited than implementing it in software, and thus is not preferred.

Referring now to FIG. 1, depicted therein is a flow chart of the overall steps involved in the method of the present invention. At step 11, the method first defines the hardware address ranges to be protected, the software address ranges permitted to access the defined hardware address ranges, and a subset of valid CPU instructions for the reference platform. At step 12, the method ensures that processor instructions are limited to instructions in the defined subset of valid CPU instructions. If an instruction is not in the defined subset, the method moves to step 13 where an error message is generated, and the simulation is stopped. At step 14, the method detects off-chip accesses, and at step 15 ensures that each off-chip access to a defined hardware address ranges is from a defined software address range. If an off-chip access to a defined hardware address ranges is detected from a software address that is not in a defined range, the method moves to step 16 where an error message is generated, and the simulation is stopped. If all conditions are met, the simulation is continued at step 17.

In the simulator environment, when a prohibited access is attempted, the access may be flagged by returning the user to the simulator prompt so that the user must take some user intervention. In a hardware implementation, the prohibited access may generate a high priority machine check or a fault of some sort (i.e, something other than the normal course of execution). It may also generate an entry into a log file, or it may stop the execution of the machine, and generate a fault that goes to a fault handler.

To implement the present invention, modifications are made to the reference platform simulator in two areas: the user interface and the execution stream. The user interface modification provides the user with the ability to define a set of hardware addresses and a set of software addresses, and to define which software modules may address which hardware, and what CPU instructions are valid. In one example, the SAL code is permitted to access hardware that controls the memory controller, or coherency controller (CC), but no other software is allowed to access this hardware. Three exemplary commands to implement such a relationship in a simulator are:

add software_address SAL 0xFE00000000 0xFFFFFFFFFF add hardware_address CC 0xF00000000 0xF100000000 SAL add cpu_type Itanium_basic The first command defines a range of software addresses, and associates the name SAL with the defined range of software addresses. The second command defines a range of hardware addresses, associates the name CC with the defined range of hardware addresses, and specifies SAL as the only software module permitted to access this hardware. The third command defines what CPU instructions may be executed (in this case, Itanium_basic), and because there is no abstraction layer specified, all of the abstraction layers are permitted to access the Itanium_basic instruction set. The third command could alternatively be written as follows:

add cpu_type McKinley_extended PAL

This command defines that the McKinley_extended instruction set is added to the Itanium_basic instruction set, and specifies PAL as the only software module permitted to access the McKinley_extended instructions.

Figure 2:
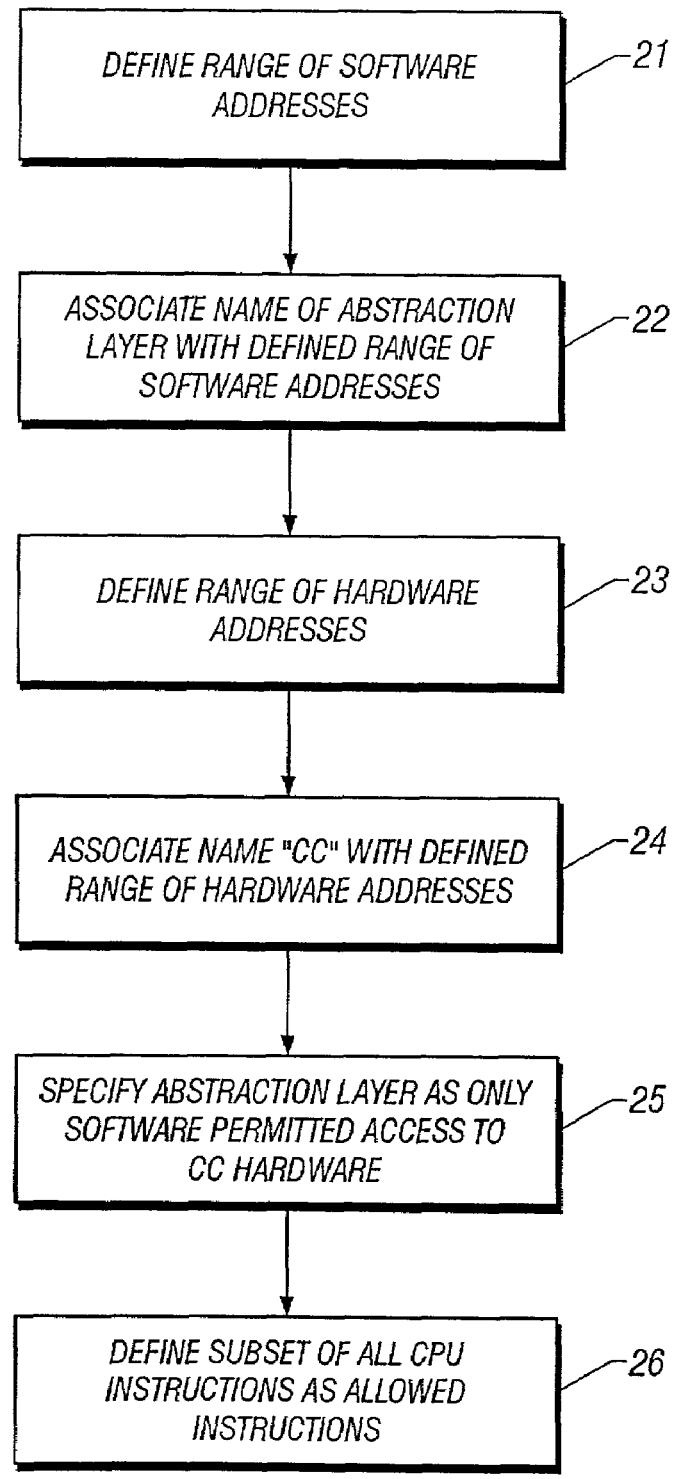
FIG. 2 depicts a flow chart of the steps involved in an exemplary user-interface process of defining hardware addresses, software addresses, allowed accesses, and specific CPU-type instructions in accordance with the teachings of the present invention.

FIG. 2 depicts a flow chart of the steps involved in an exemplary user-interface process of defining hardware addresses, software addresses, allowed accesses, and specific CPU-type instructions in accordance with the teachings of the present invention. At steps 21 and 22, the first command above is utilized to define a range of software addresses (step 21) and to associate an abstraction layer (for example SAL) with the defined range of software addresses (step 22). At steps 23–25, the second command above is utilized to define the protected range of hardware addresses (step 23), to associate a hardware device such as the CC with the defined range of hardware addresses (step 24), and to specify the named abstraction layer, SAL, as the only software module permitted to access the CC hardware (step 25). At step 26, the third command above is utilized to define a subset of all CPU instructions that may be executed in accordance with the reference platform specification.

As noted above, in addition to the user interface modifications, the present invention also makes modifications to the execution stream. The execution stream modifications are made in two areas, instruction control and control of external access from the CPU. The instruction control modification enables the user to limit the valid instructions to a base set which is a subset of all the instructions of the processor. If the processor executes an instruction that is not part of the defined base instructions, an error message is generated, and the simulation is stopped after the current instruction.

Figure 3:
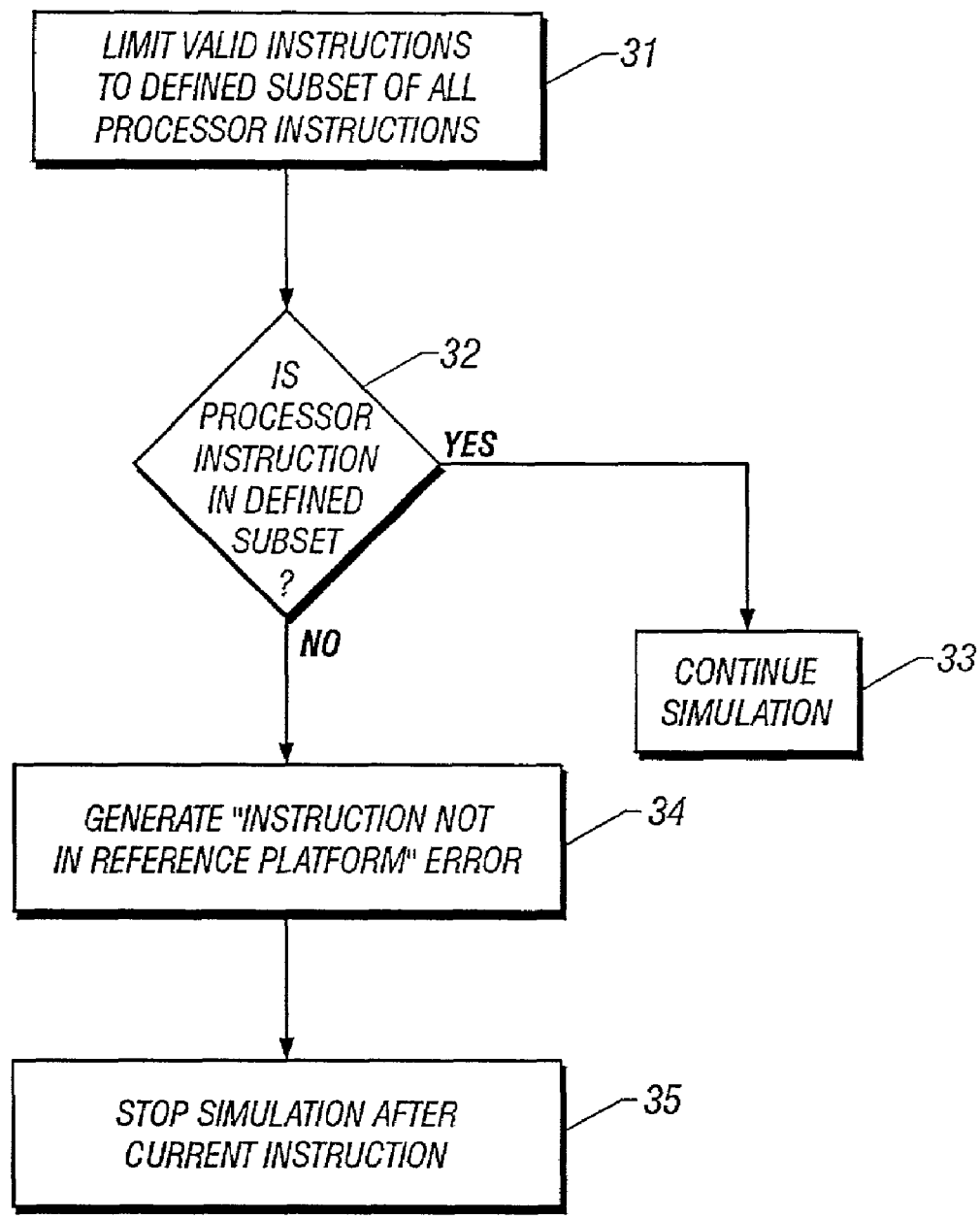
FIG. 3 depicts a flow chart of the steps involved in an exemplary execution-stream process of limiting the valid CPU instructions to a defined subset of all processor instructions in accordance with the teachings of the present invention.

FIG. 3 depicts a flow chart of the steps involved in an exemplary execution-stream process of limiting the valid CPU instructions to a defined subset of all processor instructions in accordance with the teachings of the present invention. At step 31, the instruction control modification enables the user to limit the valid instructions to a base set which is the subset of all processor instructions that was defined in step 26 of FIG. 2. At step 32, whenever the processor executes an instruction that is part of the defined subset of instructions, the process moves to step 33 where the simulation is allowed to continue. However, if the processor executes an instruction that is not part of the defined subset, an "instruction not in reference platform" error is generated at step 34. At step 35, the simulation is stopped after the current instruction.

The second area of execution stream modifications is made in the control of external access from the CPU. The external access control uses the information in the add software_address and add hardware_address commands above to ensure that only accesses from the specified software range are permitted to hardware in the specified hardware range.

Figure 4:
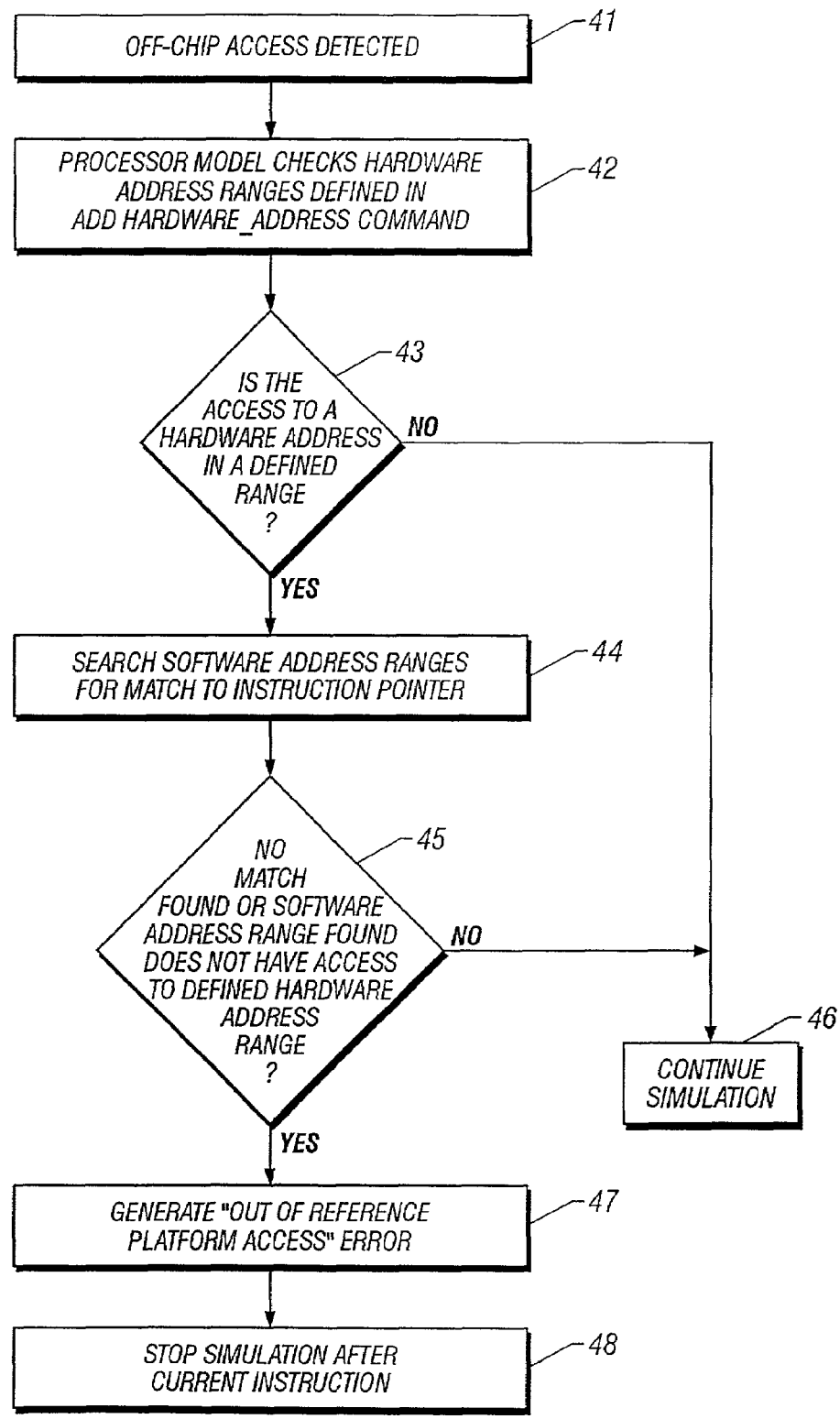
FIG. 4 depicts a flow chart of the steps involved in an exemplary execution-stream process of ensuring that off-chip accesses are permitted only from defined software address ranges to defined hardware address ranges in accordance with the teachings of the present invention.

FIG. 4 depicts a flow chart of the steps involved in an exemplary execution-stream process of ensuring that off-chip accesses are permitted only from defined software address ranges to defined hardware address ranges in accordance with the teachings of the present invention. At step 41, an off-chip access is detected. At step 42, the processor model checks all hardware address ranges that have been defined with the add hardware_address command in step 23 of FIG. 2. At step 43, it is determined whether the off-chip access is made to an address in a defined hardware address range. If not, the address is not a protected address, and the process moves to step 46 where the simulation is allowed to continue. However, if the off-chip access is made to an address in a defined hardware address range, the process moves to step 44 where the software address ranges defined in step 21 of FIG. 2 are searched for a match to the instruction pointer. At step 45, it is determined whether a match is found, or if a found software address range has access to the defined hardware address range. If a match is found, or if a found software address range has access to the defined hardware address range, the process moves to step 46 where the simulation is allowed to continue. However, if no match is found, or if the software address range found does not have access to the hardware address range, the process moves to step 47 where the simulator generates an "out of reference platform access" error. At step 48, the simulation is stopped at the completion of the current instruction.

Figure 5:
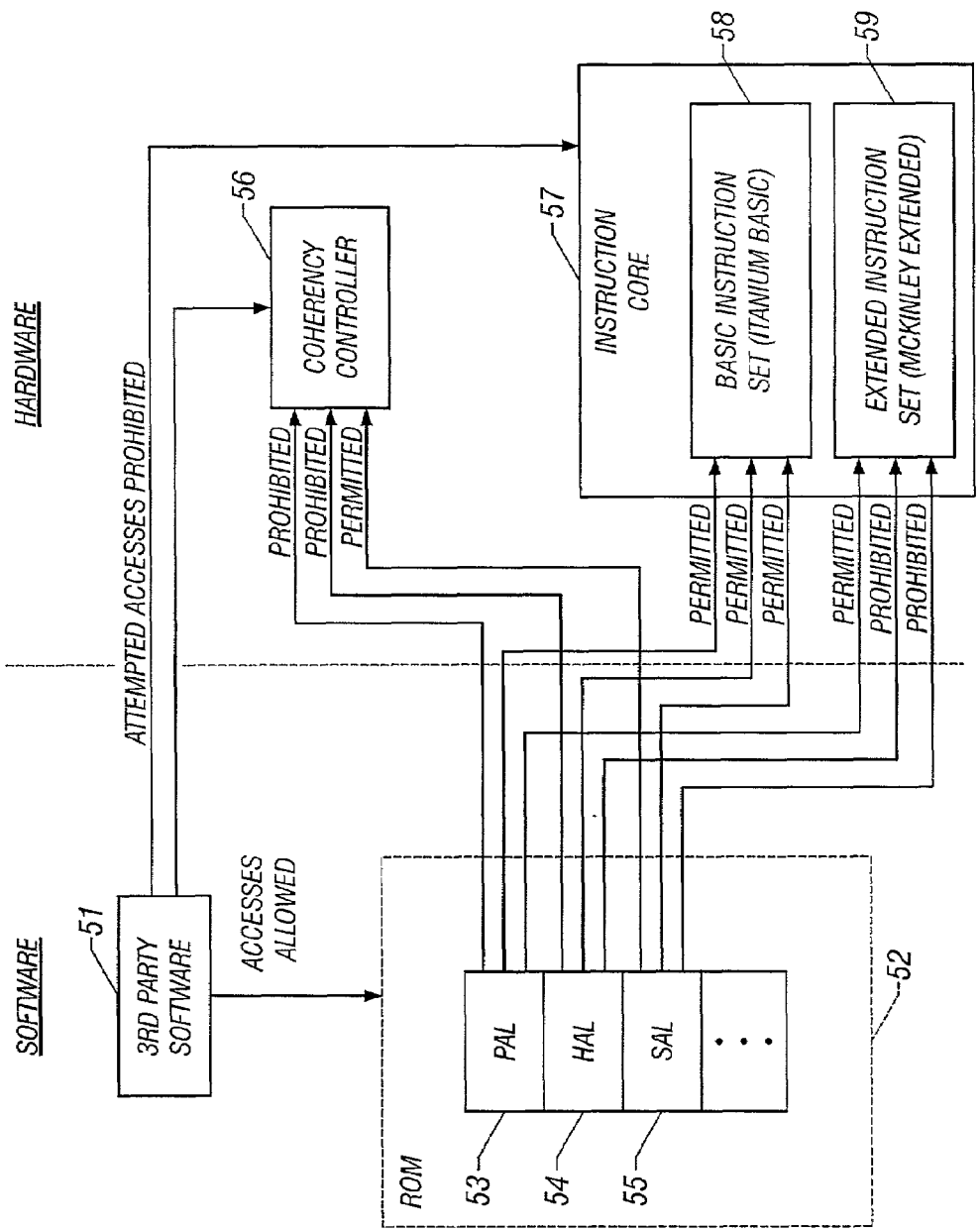
FIG. 5 depicts a simplified functional block diagram of the system of the present invention illustrating the functional relationships between the involved software modules and hardware components.

FIG. 5 depicts a simplified functional block diagram of the system of the present invention illustrating the functional relationships between the software modules and hardware involved. The invention partitions software and hardware into different address ranges and instruction sets. Software, for example, may be divided into third party software 51 and a series of abstraction layers that may be stored in ROM 52. The abstraction layers may be divided into a Processor Abstraction Layer (PAL) 53, a Hardware Abstraction Layer (HAL) 54, and a System Abstraction Layer (SAL) 55. Other abstraction layers may also be defined. Each of the abstraction layers is stored in a different software address range.

Likewise, the hardware is divided into functional areas, and the registers and other addressable hardware devices in each functional area are assigned an address in a different hardware address range. For example, the hardware in the coherency controller 56 may be in a particular address range. Within the instruction core 57, the CPU instructions are divided into a basic instruction set 58 and an extended instruction set 59. In a CPU family, there may be follow-on CPUs that build upon a basic set of CPU instructions with extensions to the basic set. For instance, in a presently preferred exemplary embodiment of the present invention, a CPU known as the Itanium processor utilizes a basic instruction set, Itanium Basic. A follow-on CPU known as the McKinley processor utilizes an extended instruction set, McKinley Extended. Problems can arise when sources authorized to access only the basic set of instructions, access and attempt to execute instructions in the extended instruction set. Therefore, the present invention selectively limits access to the instruction core to the basic instruction set 58.

The invention prohibits direct accesses from the third party software 51 to any of the protected hardware address ranges in the coherency controller 56, or to any of the CPU instruction sets in the instruction core 57. The third party software is only allowed to access these addresses through service routines provided by the abstraction layers, PAL 53, HAL 54, and SAL 55. Third party software is not allowed to execute instructions except those instructions in the Itanium_basic instruction set. For example, a third party OS may attempt to execute an instruction in the McKinley_extended instruction set 59 in the instruction core. However, as shown in FIG. 5, execution of the McKinley_extended instruction set is limited to code executing in a permitted abstraction layer (PAL in this example), and the access is prohibited when the processor recognizes that the execution address is not from one of the permitted abstraction layers.

Thus, each abstraction layer has specific hardware address ranges and instruction sets that it is permitted to access or execute. In the example illustrated in FIG. 5, the abstraction layers are all permitted to execute the basic instruction set 58 while only PAL 53 is permitted to execute the extended instruction set 59. It should be recognized by those skilled in the art, however, that the present invention may prohibit or permit any combination of the abstraction layers from executing any designated instruction set. Any unauthorized attempt to access a protected hardware address range, or to execute a protected instruction set is flagged. The simulator may then be stopped, and the user may be warned that he is accessing a protected address or instruction.

FIG. 5 illustrates a relationship in which the PAL code 53 is prohibited from accessing the coherency controller 56, but is permitted to execute the basic instruction set 58 and the extended instruction set 59. The HAL code 54 is permitted to execute the basic instruction set 58, but is prohibited from accessing the coherency controller 56 or executing the extended instruction set 59. The SAL code 55 is permitted to access the coherency controller 56 and to execute the basic instruction set 58, but is prohibited from executing the extended instruction set 59. Therefore, any off-chip access must specify the correct abstraction layer for a targeted hardware address, and any instruction execution must be from a specified software abstraction layer.

As noted above, although the preferred embodiment of the present invention is described herein in terms of modifications to a reference platform simulator, the present invention may also be practiced on actual hardware systems such as a PC. In the PC environment, some game manufacturers may design their game to directly access a hardware component such as the VGA card to get quicker performance. The present invention may be utilized in the PC environment, or in a simulator for a PC environment, to prohibit such direct accesses to the VGA card and require that access be made through the OS.

The present invention may also be tunable. For example, the invention may allow a prohibited access once, but then may give a warning that no more accesses are permitted. If another prohibited access is then attempted, an error message is generated and the simulator or machine may be stopped.

The present invention provides the benefit that hardware revisions can be made by the manufacturer, and only the HAL, SAL, and PAL codes need to be changed. The third party software is not affected since it does not access the hardware directly. An additional benefit accrues for OS developers and the developers and operators of simulators that run multiple OSs. The invention helps these developers and operators ensure that all of the OSs are clean (i.e., have no machine-specific code in them). When all of the OSs are clean, they can be shrink-wrapped and used on any hardware platform since the OSs do not perform any hardware-specific functions. It should be apparent that any known OS (e.g., HPUX®, Linux, Windows®, Windows NT®, MacOS®, any Unix-based OS, and the like) may be verified for compliance by practicing the teachings of the present invention.

Further, it is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while the teachings of the present invention have been particularly exemplified within the context of a simulator that is capable of modeling a reference platform, those skilled in the art will recognize that the present invention may be practiced in conjunction with actual hardware platforms as well. Also, whereas the use of specific commands has been described in reference to the presently preferred exemplary embodiment of the present invention, such command implementations are merely illustrative. Accordingly, all such modifications, extensions, variations, amendments, additions, deletions, combinations, and the like are deemed to be within the ambit of the present invention whose scope is defined solely by the claims set forth hereinbelow.

What is claimed is:

1. A computer implemented method of protecting a defined hardware address from being directly accessed by unauthorized software modules, said method comprising:

defining a range of software addresses associated with a particular abstraction layer that is permitted to access a defined range of hardware addresses and storing said defined range of software and hardware addresses on the hardware component storage;

detecting an attempted access to one of the defined hardware addresses;

determining whether the access is from the defined software address range;
permitting the access upon determining that the access is from the defined software address range; and
prohibiting the access upon determining that the access is not from the defined software address range.

2. The method of protecting a defined hardware address of claim 1 wherein the method is practiced on a hardware simulator, and the prohibiting the access includes:
generating an error message to a user; and
stopping the simulator after a current instruction is completed.

3. The method of protecting a defined hardware address of claim 1 wherein the method is practiced on an actual hardware machine, and the prohibiting the access includes:
generating a high priority machine check;
stopping the machine; and
generating a fault that goes to a fault handler.

4. The method of protecting a defined hardware address of claim 1 further comprising:
defining a set of authorized processor instructions;
determining whether a processor instruction being accessed is in the defined set of authorized instructions; and
stopping processor operations upon determining that the processor instruction being accessed is not in the defined set of authorized instructions.

5. The method of protecting a defined hardware address of claim 4 wherein the defining a set of authorized processor instructions includes defining a set of processor instructions that are a subset of all processor instructions.

6. The method of protecting a defined hardware address of claim 5 wherein the subset of all processor instructions form a set of authorized valid processor instructions for a reference platform.

7. A method of protecting a defined range of hardware addresses from being directly accessed by unauthorized software modules, said method comprising:
defining a range of software addresses associated with a particular abstraction layer that is permitted to access a defined range of hardware addresses, wherein the defined range of hardware addresses is identified with a hardware component;
specifying the particular abstraction layer as the only software that is permitted to access the range of hardware addresses associated with the hardware component;
detecting an attempted access to a hardware address in the range of hardware addresses associated with the hardware component;
determining whether the access is from a software address in the range of software addresses associated with the particular abstraction layer;
permitting the access upon determining that the access is from a software address in the range of software addresses associated with the particular abstraction layer; and
prohibiting the access upon determining that the access is not from a software address in the range of software addresses associated with the particular abstraction layer.

8. The method of protecting a defined range of hardware addresses of claim 7 further comprising:
defining a set of authorized processor instructions;
determining whether a processor instruction being accessed is in the defined set of authorized instructions; and
stopping processor operations upon determining that the processor instruction being accessed is not in the defined set of authorized instructions.

9. A method of protecting a defined range of hardware addresses from being directly accessed by unauthorized software modules, said method comprising:
defining a range of software addresses associated with a particular abstraction layer that is permitted to access a defined range of hardware address, wherein the defined range of hardware addresses is identified with a hardware component;
specifying the particular abstraction layer as the only software that is permitted to access the range of hardware addresses associated with the hardware component;
detecting an attempted access to a hardware address;
determining whether the attempted access is directed to a hardware address in the range of hardware addresses associated with the hardware component;
upon determining that the attempted access is directed to a hardware address in the range of hardware addresses associated with the hardware component, searching the defined software address ranges for a match to an instruction pointer in the attempted access; and
prohibiting the access if no match to the instruction pointer is found.

10. The method of protecting a defined range of hardware addresses of claim 9 further comprising prohibiting the access if a match to the instruction pointer is found in a software address range that is not associated with the particular abstraction layer.

11. The method of protecting a defined range of hardware addresses of claim 9 further comprising:
defining a set of authorized processor instructions;
determining whether a processor instruction being accessed is in the defined set of authorized instructions; and
stopping processor operations upon determining that the processor instruction being accessed is not in the defined set of authorized instructions.

12. A system for protecting a defined range of hardware addresses from being directly accessed by unauthorized software modules, said system comprising:
a plurality of hardware components in a functional area of a processing machine, said hardware components having a defined range of hardware addresses;
a module with a particular abstraction layer code having a defined range of software addresses, said particular abstraction layer code being permitted to access the hardware addresses in the defined range of hardware addresses;
access detecting means for detecting an attempted access to a hardware address in the defined range of hardware addresses;
software searching means for determining whether the attempted access is from the particular abstraction layer code; and
error generation means for prohibiting the access and generating an error message upon determining that the access is not from the particular abstraction layer code.

13. A method of verifying software code compliance with respect to a reference platform, comprising:
associating a hardware component of the reference platform with a defined range of hardware addresses;
defining a range of software addresses associated with a particular abstraction layer that is allowed to access the defined range of hardware addresses;

executing a code portion in a computing environment associated with the reference platform;

determining whether any instruction of the code portion attempting to access at least one of the protected hardware addresses is not from the range of software addresses allowed to access the hardware addresses; and in response to determining that an instruction of the code portion attempting to access at least one of the protected hardware addresses is not from the range of software addresses allowed to access the hardware addresses, providing a flag to indicate the attempted access by the code portion to one of the protected hardware addresses.

14. The method of claim 13 wherein the computing environment comprises an architectural simulator.

15. The method of claim 14 wherein the code portion comprises an operating system.

16. The method of claim 14 wherein the code portion comprises application software.

17. The method of claim 16 wherein the application software comprises computer game software.

18. A computer implemented method of protecting a defined subset of processor instructions from being executed by unauthorized software modules, said method comprising:

defining a set of processor instructions that are allowed to be accessed by at least one particular abstraction layer;

defining a range of software addresses permitted to execute the defined set of processor instructions, the software addresses being associated with the at least one particular abstraction layer and storing said defined range of software and hardware addresses on the hardware component storage;

determining whether an attempted execution of an instruction in the defined set of processor instructions is from a defined software address;

permitting execution of the instruction in the defined set of processor instructions upon determining that the attempted execution is from the defined software address; and prohibiting execution of the instruction in the defined set of processor instructions upon determining that the attempted execution is not from the defined software address.

19. The method of protecting a defined subset of processor instructions of claim 18 wherein the defining a set of processor instructions includes defining a set of processor instructions that are a subset of all processor instructions.

20. The method of protecting a defined subset of processor instructions of claim 19 wherein the subset of all processor instructions form a set of authorized valid processor instructions for a reference platform.

21. The method of protecting a defined subset of processor instructions of claim 18 further comprising:

defining a software address that is permitted to execute the defined set of processor instructions, the software address being associated with the at least one particular abstraction layer;

determining whether an attempted execution of an instruction in the defined set of processor instructions is from the defined software address;

permitting execution of the instruction in the defined set of processor instructions upon determining that the attempted execution is from the defined software address; and prohibiting execution of the instruction in the defined set of processor instructions upon determining that the attempted execution is not from the defined software address.

* * * * *

UNITED STATES PATENT AND TRADEMARK OFFICE
CERTIFICATE OF CORRECTION

PATENT NO. : 7,162,743 B1  
APPLICATION NO. : 09/971327  
DATED : January 9, 2007  
INVENTOR(S) : Joe Bolding et al.

Page 1 of 1

It is certified that error appears in the above-identified patent and that said Letters Patent is hereby corrected as shown below:

In column 10, line 9, in Claim 9, delete "address" and insert -- addresses --, therefor.

In column 10, line 47, in Claim 12, after "with" delete "a".

In column 12, lines 18-34, delete "21. The method of protecting a defined subset of processor instructions of claim 18 further comprising: defining a software address that is permitted to execute the defined set of processor instructions, the software address being associated with the at least one particular abstraction layer; determining whether an attempted execution of an instruction in the defined set of processor instructions is from the defined software address; permitting execution of the instruction in the defined set of processor instructions upon determining that the attempted execution is from the defined software address; and prohibiting execution of the instruction in the defined set of processor instructions upon determining that the attempted execution is not from the defined software address.".

Signed and Sealed this

Eighteenth Day of November, 2008

JON W. DUDAS  
*Director of the United States Patent and Trademark Office*